Oct. 7, 1969   J. F. ANDRS ET AL   3,470,729
BROACHING TOOL
Filed Sept. 22, 1966
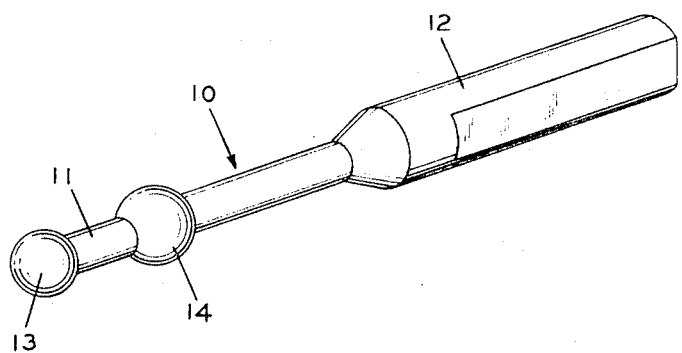
INVENTORS:
JERRY F. ANDRS
KERMIT ELLEDGE
BY
ATTORNEY 3,470,729
BROACHING TOOL
Jerry Frank Andrs, Chester, and Kermit Elledge, Prince George, Va., assignors to Allied Chemical Corporation, New York, N.Y., a corporation of New York
Filed Sept. 22, 1966, Ser. No. 581,310
Int. Cl. B23d *43/00;* B21c *25/10;* B23p *15/42*
U.S. Cl. 72—476          3 Claims

ABSTRACT OF THE DISCLOSURE

A broaching tool having a first sphere-shape broaching element on the working end thereof and a distance therefrom a second sphere-shaped broaching element having a diameter greater than the first broaching element for smoothing spinnerette capillaries.

---

The present invention relates to a broaching tool and more particularly to a broaching tool for smoothing spinneret capillaries after drilling and reaming.

As is known in the manufacture of spinnerets, it is usually common to drill a series of orifices in a spinneret plate and the drilled orifices are thereafter reamed and then broached to smooth out the interior of the orifices. These orifices are known in the art as spinneret capillaries. The broaching operation is necessary because it is very difficult to drill orifices in spinneret plates which are considered a finished product requiring no further treatment. Conventional apparatus normally employed for the broaching operation generally takes the form of a shaft-like tool which is rounded at the end which enters the spinneret capillary. Unfortunately, conventional broaching tools are difficult to insert and to remove from the spinneret capillary. In addition, it is difficult to work the tool through the capillary of the spinneret.

An object of the present invention is to provide a broaching tool to smooth spinneret capillaries after drilling and reaming, which broaching tool is easy to insert and withdraw from the spinneret capillary to be serviced. Another object is to provide a broaching tool which permits the broaching to be done in increments thereby requiring less working energy to service the material than heretofore possible.

These and other objects are accomplished by the present invention wherein there is provided a broaching tool which comprises a rod having a working end portion and a holding end portion, said working end portion having less cross-sectional area than said holding end portion and having disposed thereon a plurality of broaching elements, said broaching elements nearest to said holding end portion being sized progressively larger than the broaching elements further away from said holding end portion.

For a clearer understanding of the invention, reference is made to the drawing which is a view in perspective showing the broaching tool of the present invention. It will be seen that the broaching tool comprises a rod 10 having a working end portion 11 and a holding end portion 12. The holding end portion is adapted to be inserted into an apparatus capable of securing and rotating the rod, such as a drill and the like. The rod is preferably formulated from a metal and is preferably solid throughout its entire length.

As will be seen from the drawing, the holding end portion 12 is of a larger cross-sectional area than the working end portion 11, the latter being sized to permit the entrance of the working end portion into the material to be serviced i.e., into the orifice or capillary of the spinneret to be broached. Disposed near one end of the working end portion 11 of the rod 10 preferably at the extreme end, is a broaching element 13 which is shown in the drawing as being in the form of a solid sphere or knob having a larger cross-sectional area than the working end portion 11 and is of a size and configuration such as to be capable of broaching the capillary of a spinneret when it is forced through the capillary. Positioned next to the knob 13 and approximately one capillary length therefrom is another knob 14 which is slightly larger in dimension than the knob 13. Thus, knob 13 is sized to perform the first increment of broaching of the orifice in the spinneret, whereas the second knob 14 is positioned and sized to add the last and final increment of broaching. It will be obvious that by spacing the knobs at least one capillary length apart that no additional force would be required to push the rod through the first spinneret orifice. Although only two such broaching elements are shown, it will be obvious that more than two can be employed, each being sized progressively larger as they approach the holding end portion.

In a representative technique of operation, the material to be serviced, for example, the spinneret plate which has been drilled and reamed through its width to form the capillary orifices are positioned in a manner such as to permit the broaching tool to pass through the orifices of the spinneret plate. For this purpose, the same drilling apparatus used to drill the capillaries in the spinneret plate can be employed with the broaching tool being inserted in the place which normally accommodates the drill. Under the conditions of operation, the rod approaches the spinneret plate and the working end portion enters the capillary to be serviced. The first knob positioned on the rod engages the spinneret capillary and passes therethrough until the second knob positioned about one capillary length away reaches the opening of the capillary. The same downward force causes the second knob to pass through the capillary opening thereby completing the broaching operation.

By employing the apparatus of the present invention, the broaching operation becomes relatively simple since the broaching tool is easy to insert and withdraw from the capillary. Moreover, the broaching is done in increments thereby requiring less working energy to service the material than heretofore possible.

Although certain preferred embodiments of the invention have been disclosed for purpose of illustration, it will be evident that various changes and modifications may be made therein without departing from the scope and spirit of the invention.

We claim:
1. A broaching tool for broaching spinnerette capillaries which comprises a rod having a working-end portion and a holding-end portion, said working-end portion having lesser cross-sectional area than said holding-end portion and having rigidly secured thereon a first sphere-shaped broaching element disposed on the extreme end of said working-end portion and forming a terminal part thereof and a second sphere-shaped element spaced and secured a capillary length therefrom and having a diameter greater than said first element.

2. A broaching tool as described in claim 1 further characterized by at least one additional sphere-shaped broaching element spaced a capillary length from said second element and having a diameter progressively larger than the first and second sphere-shaped elements.

3. A broaching tool as described in claim 2 in which the sphere-shaped elements are selectively spaced whereby not more than one of said elements are within a capillary simultaneously.

References Cited

UNITED STATES PATENTS

| | | | |
|---|---|---|---|
| 1,318,538 | 10/1919 | Bunting | 29—95.1 |
| 1,441,503 | 1/1923 | Hook | 29—95.1 |
| 1,485,652 | 3/1924 | Wakefield et al. | 29—95.1 |
| 1,610,870 | 12/1926 | McCarty | 72—479 X |
| 1,938,424 | 12/1933 | Hart | 29—95.1 |
| 2,972,274 | 2/1961 | La Bombard et al. | 29—95.1 |
| 423,544 | 3/1890 | Vanderman | 72—479 X |
| 2,345,443 | 3/1944 | Aiken | 72—479 X |

CHARLES W. LANHAM, Primary Examiner

E. SUTTON, Assistant Examiner

U.S. Cl. X.R.

72—479